United States Patent [19]
Heanue et al.

[11] Patent Number: 6,049,430
[45] Date of Patent: Apr. 11, 2000

[54] HIGH NUMERICAL APERTURE OBJECTIVE LENS MANUFACTURABLE IN WAFER FORM

[75] Inventors: John F. Heanue, San Jose; Mark A. Wardas, La Jolla, both of Calif.

[73] Assignee: Seagate Technology, Scotts Valley, Calif.

[21] Appl. No.: 09/191,259

[22] Filed: Nov. 12, 1998

[51] Int. Cl.$^7$ ............................................. G02B 3/00
[52] U.S. Cl. .................................... 359/642; 156/626
[58] Field of Search ............................. 156/643, 626; 359/619, 642, 664

[56] References Cited

U.S. PATENT DOCUMENTS

5,286,338  2/1994  Feldblum et al. ..................... 156/643
5,288,998  2/1994  Betzig et al. ........................ 250/227.26

*Primary Examiner*—Georgia Epps
*Assistant Examiner*—Y. Timothy Lee
*Attorney, Agent, or Firm*—Mark A. Wardas

[57] ABSTRACT

A composite micro-lens for use in an optical or magneto-optical information storage system, made up of one or more lens elements which, when coupled in assembly, provide a desired numerical aperture. The design may provide, if necessary, a photo resist lens, a shaped ball lens, or one or more contoured surfaces within the composite construction to correct for aberrations. The composite lens designed in this manner allowing for the use of wafer-level assembly processes to provide high volume production capabilities. It is further intended that this micro-lens design support integration in an optical or magneto-optical head design.

15 Claims, 6 Drawing Sheets

Multi-layer lithography and etching is used to fabricate a shallow aspheric element in synthetic fused silica.

Front-back alignment and photoresist reflow create a lens on the reverse surface.

High index substrate glass is polished to recise thickness tolerance. Photoresist lens is patterned and reflowed.

First and second wafers are aligned and bonded using UV cure adhesive. Elements are diced from completed wafer pair.

HIGH NUMERICAL APERTURE OBJECTIVE LENS MANUFACTURABLE IN WAFER FORM

BACKGROUND OF THE INVENTION

1. Field of the Invention

The present invention relates generally to manufacture and use of wafer level optics with optical heads and more particularly to manufacture and use of a high numerical aperture (NA) objective micro-lens through an assembly of subcomponents that can be produced in an array format using wafer-level techniques.

2. Background Art

Prior to this invention, the manufacture of high numerical aperture objective lens involved a molding and a polishing of an aspheric surface using a high-index (of refraction) glass, techniques not capable of producing micro-lenses at high production rates. Current methods of producing a micro-part makes use of wafer-level processes, which can include an etch (ion milling), or a photoresist reflow technique. However, these processes are generally limited to a low-index glass (typically silica) with a spherical or near-spherical surface, or to a diffractive surface, preventing their use in the fabrication of high-quality, high numerical aperture lens.

Information storage technology and the storage capacity available therefrom has historically been limited by a number of factors. A typical prior art Winchester magnetic storage system includes a magnetic head that has a body and a magnetic read/write element and is coupled to a rotary actuator magnet and coil assembly by a suspension and actuator arm so as to be positioned over a surface of a spinning magnetic disk. In operation, lift forces are generated by aerodynamic interactions between the magnetic head and the spinning magnetic disk. The lift forces are opposed by equal and opposite spring forces applied by the suspension such that a predetermined flying height is maintained over a full radial stroke of the rotary actuator assembly above the surface of the spinning magnetic disk.

Head designs are being used with other storage technologies, in particular, magneto-optical (MO) storage technology. In one type of MO storage system, a magneto-optical head assembly is located on an actuator that moves the head along a radial direction of the disk to position the optical head assembly over data tracks during recording and readout. A magnetic coil is placed on a separate assembly on the head assembly to create a magnetic field that has a magnetic component in a direction perpendicular to the disk surface. A vertical magnetization of polarity, opposite to the surrounding material of the medium, is recorded as a mark indicating zero or a one by first focusing a beam of laser light to form an optical spot on the disk. The optical spot functions to heat the magneto-optical material to a temperature near or above a Curie point (i.e. a temperature at which the magnetization may be readily altered with an applied magnetic field). A current, passed through the magnetic coil, orients the spontaneous magnetization either up or down. This orientation process occurs only in the region of the optical spot where the temperature is suitably high. The orientation of the magnetization mark is preserved after the laser beam is removed. The mark is erased or overwritten if it is locally reheated to the Curie point by the laser beam while the magnetic coil creates a magnetic field in the opposite direction.

Information is read back from a particular mark on the disk by taking advantage of the magnetic Kerr effect to detect a Kerr rotation of the optical polarization that is imposed on a reflected light beam by the magnetization at the mark of interest, the magnitude of the Kerr rotation being determined by the material's properties (embodied in the Kerr coefficient). The sense of the rotation is measured by established differential detection schemes as being clockwise or counter-clockwise depending on the direction of the spontaneous magnetization at the mark of interest.

Conventional magneto-optical heads tend to be based on relatively large optical assemblies which make the physical size of the head rather bulky. Consequently, the speed at which conventional MO heads are mechanically moved to access new data tracks on a MO storage disk, known as a 'seek time' is slow. In addition, due to the large size of these optical assemblies, most commercially available MO disk drives use only one MO head to enable reads and writes to one side of a MO disk at a time.

Magneto-optical information access requires the use of polarized laser light for reading and writing information on an MO disk. In the case of reading information, MO technology makes use of the magneto-optical effect ("Kerr" effect) to detect a modulation of polarization rotation imposed on the linearly polarized incident laser beam by the recorded domain marks in the recording layer. The polarization rotation (representing the information stored at recorded marks or in the edges of the recorded marks) is embodied in a reflection of the linearly polarized laser beam and is converted by optics and electronics for readout. Magneto-optical technology allows for increased storage capacity with drives through the ability to store information on the particular storage disk with an increased areal density.

Larger capacity MO drives can be designed by increasing the number of disk platters and attendant read/write MO heads (over the current MO convention); this requires the provision of a MO head for each side of each disk platter. In these designs an increase in the rate of information transfer from the hard drive is desirable. The factors which effect overall information transfer from a hard drive include: a data-transfer rate, the head 'seek' time (a function of a rate of movement of the actuator-arm-head assembly), and a drive rotation rate. Therefore, as the areal density increases, and the number of MO heads per drive increases, it is a corollary that the MO head size will need to be decreased for packaging reasons as well as to improve performance.

To this end and others, what is needed is a method for manufacturing micro-lenses, alone or in combination with an optical head, with high numerical aperture, and/or by using the large volume processes of wafer production.

OBJECTS AND ADVANTAGES

The present invention provides several objects and advantages, including:

(a) to provide for a micro-lens with a high numerical aperture;

(b) to manufacture the lens using a wafer-level manufacturing technique;

(c) to meet the constraints of (a) and/or (b) through a design of a composite lens having one or more lens elements;

(d) to place aberration correcting contoured surfaces within the composite lens as necessary;

(e) to provide the micro-lens design to be compatible with wafer-level processes applicable to total MO or optical head fabrication; and (f) to provide a head design with a small mass and size.

SUMMARY OF THE INVENTION

A numerical aperture is a measure of a resolving power of a lens, which is a function of the lens geometry and a refractive index of the lens-space medium. With a present invention, a high NA micro-lens is achieved through the use of a single lens or multiple converging lenses placed in series.

In the present invention, a multi-component or composite lens is designed where each lens element and lens subassembly either is manufactured by, or can be used in, wafer-level processes in an array format. These available processes include; reflow of photoresist, and etching (including ion milling) the lens from a silica substrate. Because the individual lens elements can have the relatively low NA, these processes can be used to manufacture the various elements of the composite lens.

The invention may construct a single or a stack of two or more lens-substrate subassemblies. For a two-lens design, this construction begins a first subassembly by placing a first element on a flat silica (SiO2) wafer by a combination of any of the mentioned processes; etching a curved surface into the silica wafer, the photoresist addition of a lens onto the wafer, or secondarily fixing a separate lens element to the wafer. A second subassembly is constructed in the manner similar to any of the approaches mentioned for the first subassembly. For subassemblies not having the wafer substrate micro-etched, high NA materials can be considered for the substrate to further 'boost' the overall lens NA.

Another approach is to provide a lens element from a sphere (ball) with a well-controlled diameter, which is readily obtained in a variety of materials having an index of refraction >1.6 including a high-index glass or crystalline material. These spheres can be inserted into an opening etched into the wafer. The spheres may be glued or soldered in place and the assembly polished back to an appropriate thickness creating a flat surface on the sphere. The second wafer subassembly can be bonded to the first and individual composite lenses are obtained by dicing the resulting final wafer assembly. If needed, even more subassemblies can be added, or stacked, to achieve the desired numerical aperture. In addition, any wafer surface may be contoured to correct for aberrations introduced by the lenses. The lenses and other refractive surfaces may make use of anti-reflective (AR) coatings to improve light transmission.

The composite micro-lens can then be placed into a magneto-optical (MO) or optical head to provide light convergence to a spot on a read or read/write surface. Further, the MO or optical head may be completely fabricated through wafer-level processes in which the micro-lens may be manufactured as part of a micro-head construction. In this case, rather than placing the lens in the head, the micro-lens could be fabricated as part of an integral construction of the overall head. The final head design is preferably compact and low mass to provide improved performance in the optical drive.

BRIEF DESCRIPTION OF THE ILLUSTRATIONS

DETAILED DESCRIPTION OF THE PREFERRED EMBODIMENT

Figure 1:
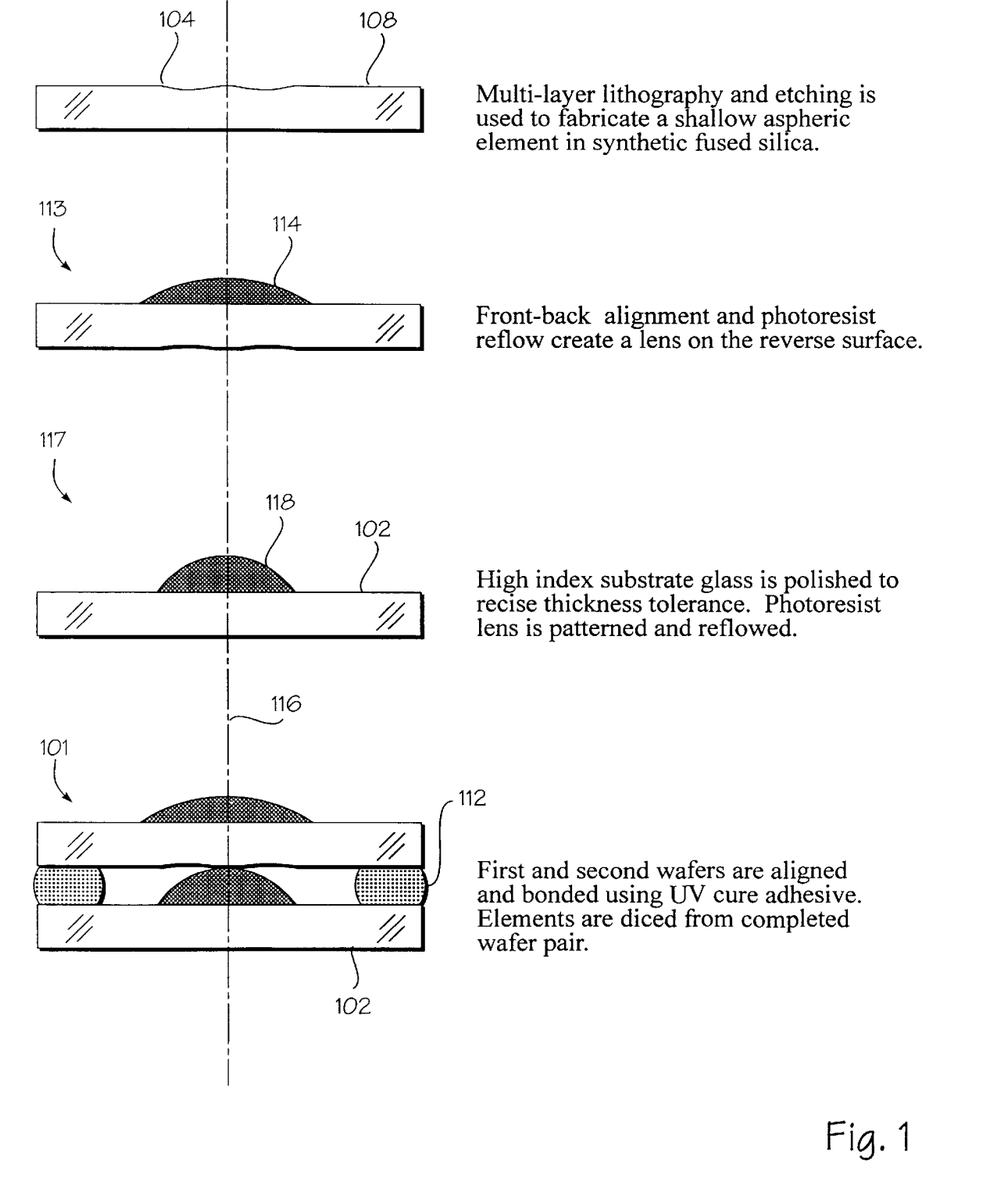
FIG. 1 is a cross-section view of a preferred embodiment assembly process for a composite micro-lens manufacture having two photoresist reflow lens elements.

Referring to FIG. 1 there is seen a cross-section view depicting a set of basic assembly steps for a composite lens of a preferred embodiment. Here a first subassembly 113 is made using a wafer substrate 108 made from, for example, silica, which may be polished to achieve a thickness and then, if desired, etched to obtain an aspheric contour 104. The aspheric contour, by proper design of the surface, acts as a lens element to provide correction to aberrations placed in the light path by other media such as the lenses and/or substrates. To the substrate 108 is applied a first photoresist reflow lens element 114 on a side opposite and centered to the aspheric contour 104. A second subassembly 117 wafer substrate 102 is polished flat to a thickness. A second lens element 118 is placed by photo resist on the second substrate surface 102. The second substrate 102 can be of a high numerical aperture (NA) material. An anti-reflective (AR) coating (not shown) may be applied to both first and second wafer subassemblies. The optical axis of the lenses 114/118 are aligned, and the subassemblies 113/117 bonded, such as with a UV cure adhesive 112 or the like, to form a composite lens 101. In an alternative embodiment (not shown) the aspheric contour 104 and the lens element 114 could be placed on opposite sides of one substrate.

The lenses 114/118 may comprise a photo resist, for example, a phenol formaldehyde class of resin that functions effectively at a nominal operating temperature of 23° C. and a 660 nm laser frequency used in an optical system. The phenol formaldehyde resin has a relatively high thermal expansion and a refractive index, which varies with a temperature, which should be considered in any design. This design reduces complexity of fabrication and leads to a higher yield with lower production risks. It is understood that the present invention is not limited to a phenol formaldehyde class of resins, as other optical resins currently exist and may be used by those skilled in the art.

Figure 3:
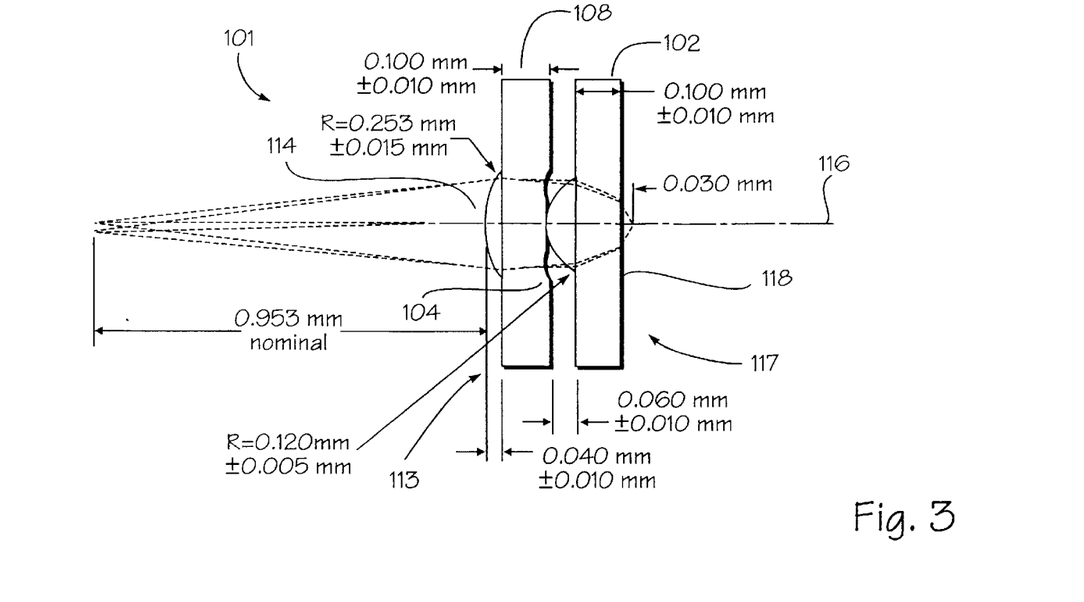
FIG. 3 is the cross-section of the preferred embodiment.

Referring now to FIG. 3, there is seen a cross-section of an exemplary embodiment. This design comprises two 100 μm thick substrates, the first 108 of SiO2 and the second 102 of Schott SF56A glass (Schott Glass Technologies Inc., Durea, Pa.). SF56A provides the higher index medium through which a 'boost' in the NA maybe obtained. As with the photoresist, it is to be understood that SF56A glass is only one of a number of materials that can be used in this application. As discussed above, each of the substrates has the custom designed photoresist micro-lens fabricated on one side. However, it should be kept in mind that a design may also place a lens on both sides of a single substrate to increase converging power. The first assembly 113 photoresist lens 114 has a radius of curvature of 0.253 mm on a 0.100 mm thick SiO2 substrate 108. The back surface of the SiO2 substrate 108 is etched to comprise an aspheric profile 104, which may be designed to correct for an aberration placed in a light path by the lenses and/or substrates. In other embodiments it is understood that an aspheric profile 104 may not necessarily be required. The second assembly 117 has the photoresist lens 118 with a 0.120 mm radius deposited onto a 0.100 thick substrate 102 of the SF56A glass.

Figure 2:
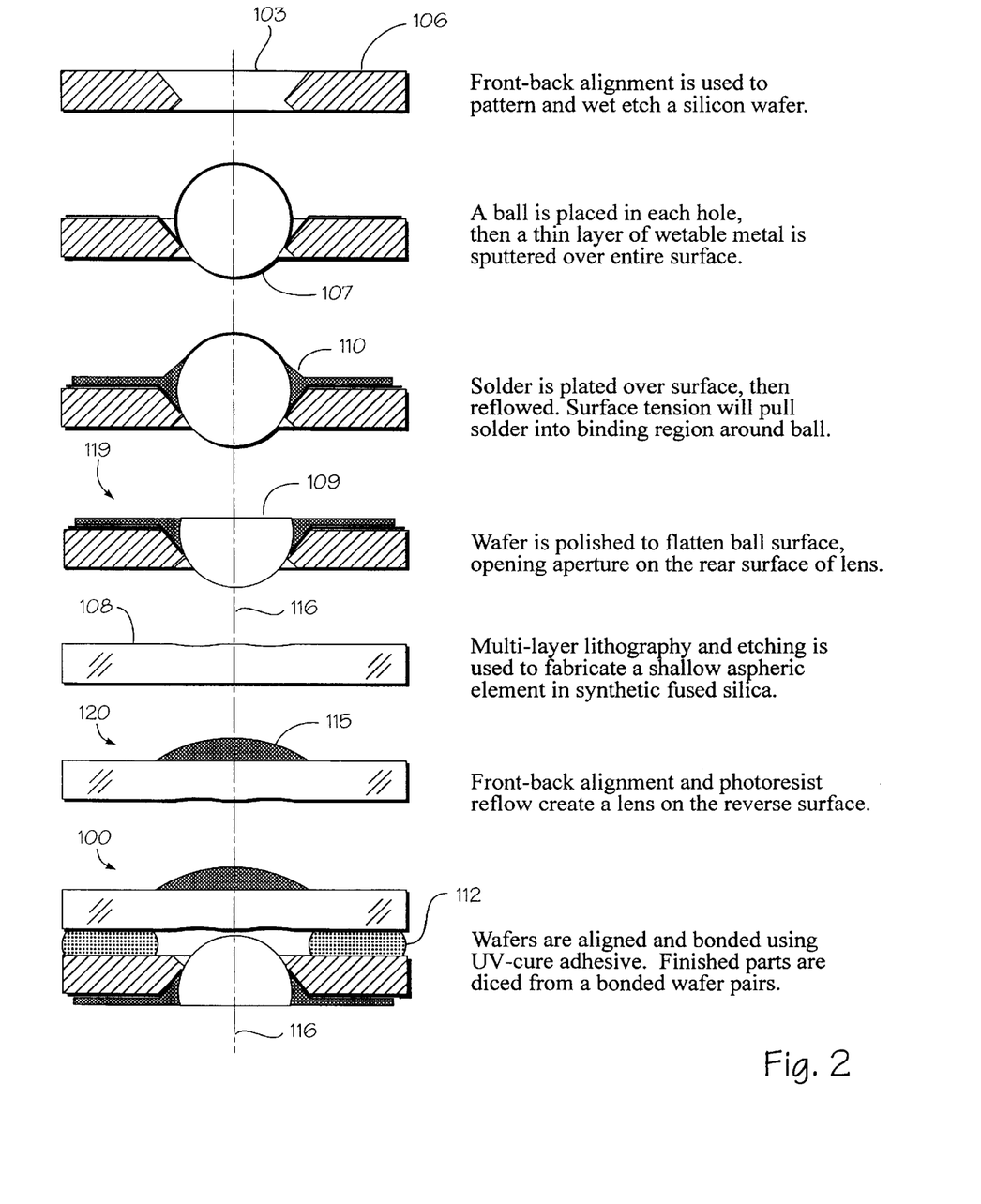
FIG. 2 is an alternate embodiment of the composite micro-lens assembly combining a sphere and a photoresist reflow lens element.
Figure 4:
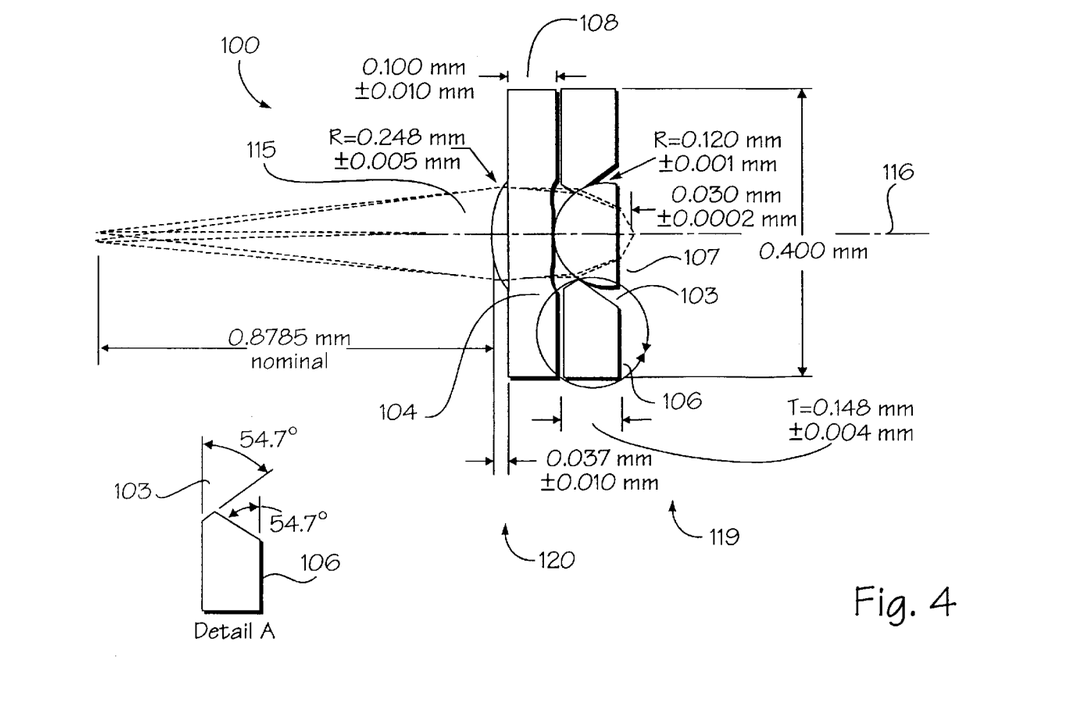
FIG. 4 is the cross-section of the alternate embodiment.

Referring now to FIGS. 2 and 4, there is seen an alternate embodiment including a third subassembly 120 comprising a lens element 115 with construction similar to subassemblies 113 and 117 of FIG. 1. A fourth subassembly 119 is manufactured to include a holder or patterned opening 103 in a silica wafer substrate 106. A sphere or ball lens 107 is placed into the opening 103 and fixed in place using any effective means. Such means could include but are not limited to bonding with an adhesive such as an epoxy, or soldering with a metal film 110. One side of the wafer substrate 106 is then polished to provide the sphere 107 with a substantially flat surface 109 on and provides an exemplary 0.030 mm lens-to-image working distance. The two subassemblies are then aligned 116 and bonded with a UV cure adhesive 112 to obtain a final assembly 100. In other embodiments the substantially flat surface 109 could further be etched or formed to comprise a contour or aspheric surface.

In an exemplary embodiment, the third subassembly 120 photoresist lens 115 comprises a radius of curvature of 0.248 mm on the 0.100 mm thick SiO2 substrate 108 with a back surface of the substrate 108 having an aspheric profile 104. The fourth subassembly 119 comprises a 0.120 mm radius lens constructed by fixing the sphere 107 into the opening 103 in the 0.100 thick substrate 106 of SiO2. In applications where the maintenance of a polarization is not required, materials such as a sapphire ball can be considered for use as the sphere lens 107, which is beneficial because they are readily obtained and inexpensive. Where the polarization state of light must be maintained throughout the light path, as in a MO head environment, various other optical glasses well known in the art, may be used for the ball lens. The two substrate assemblies are aligned 116 and bonded 112 such that the aspheric surface 104 and the sphere lens 108 are in optical alignment.

Figure 5:
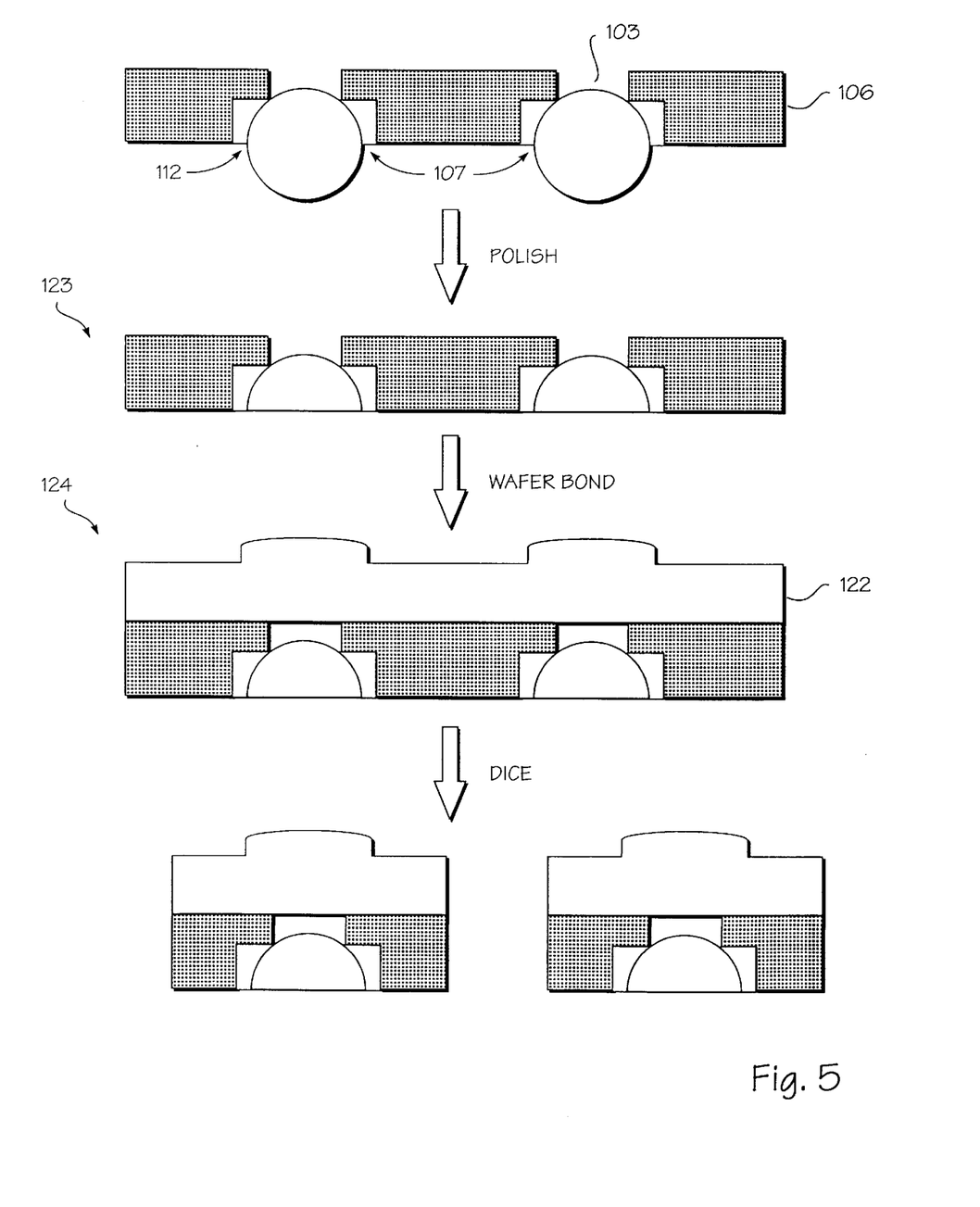
FIG. 5 is a second alternate embodiment assembly process showing the sphere and a single piece lens-substrate element.

Referring now to FIG. 5, there is seen a second alternate embodiment assembly in which a fifth subassembly 123 is constructed similar to the fourth subassembly 119 shown in FIG. 2. In this embodiment, a single piece lens-substrate subassembly 122 is constructed by etching a lens in a silica wafer (or a lens element may be etched or otherwise fabricated separately and secondarily bonded to a wafer). As with the other embodiments, an aspheric surface within a light path, may be contoured for aberration correction if required. Bonding of the two subassemblies 122/123 completes a final assembly 124. Subsequent dicing may be used to produce an individual composite lens.

Figure 6:
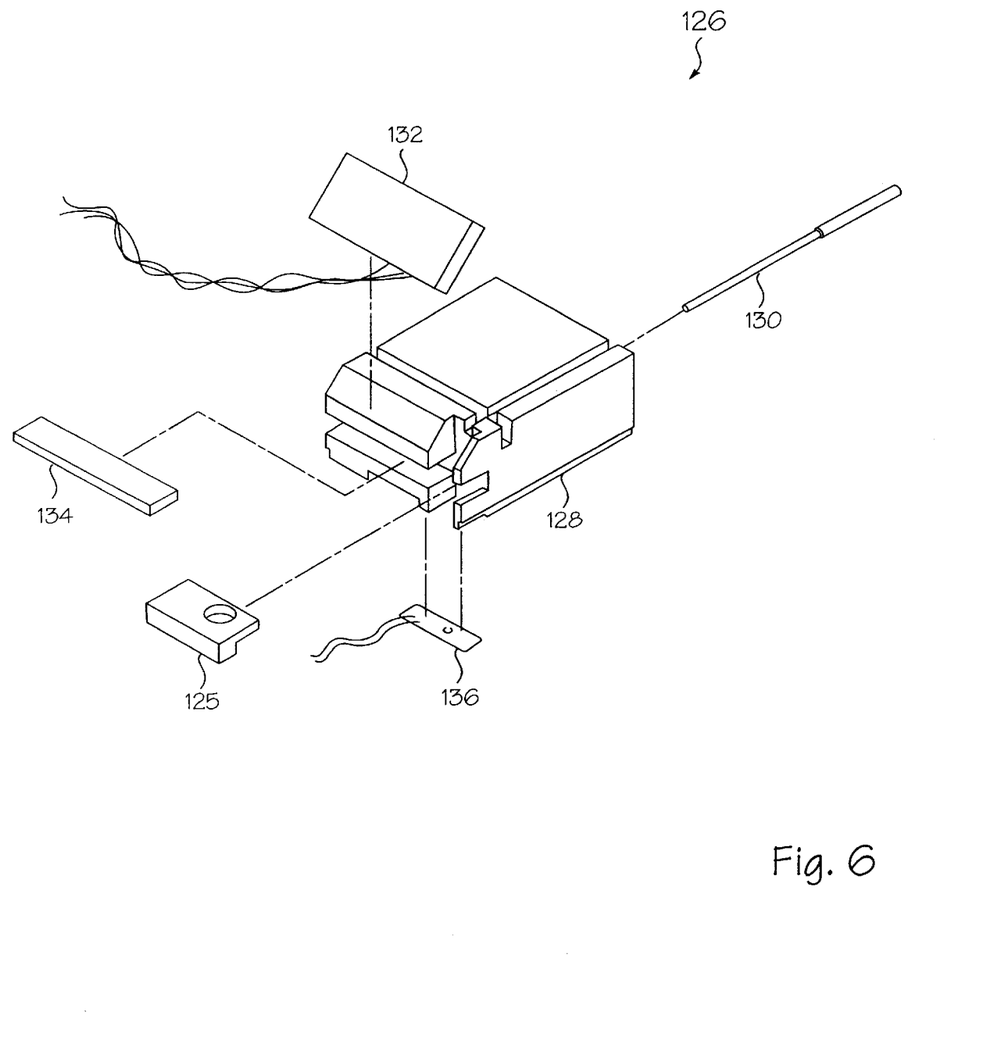
FIG. 6 is a 3D exploded view of a typical MO head showing the placement of the composite micro-lens.

Referring now to FIG. 6, there is seen a micro MO head 126 which includes components and subassemblies produced with, or in part by, wafer-level assembly methods, which may be subsequently assembled. Within FIG. 6 is seen a body 128, into which is positioned an optical fiber 130 to send and receive light to and from a mirror 132. The mirror 132 includes a moveable portion (not shown) to steer a light through the composite micro-lens 125 and to focus the light to a spot (not shown) on the recording medium (not shown). Also included in the head 126 is a magnetic coil 136 to magnetize the recording medium. If a polarization light is used, a quarter wave plate 134 may be placed in the light path.

Figure 7:
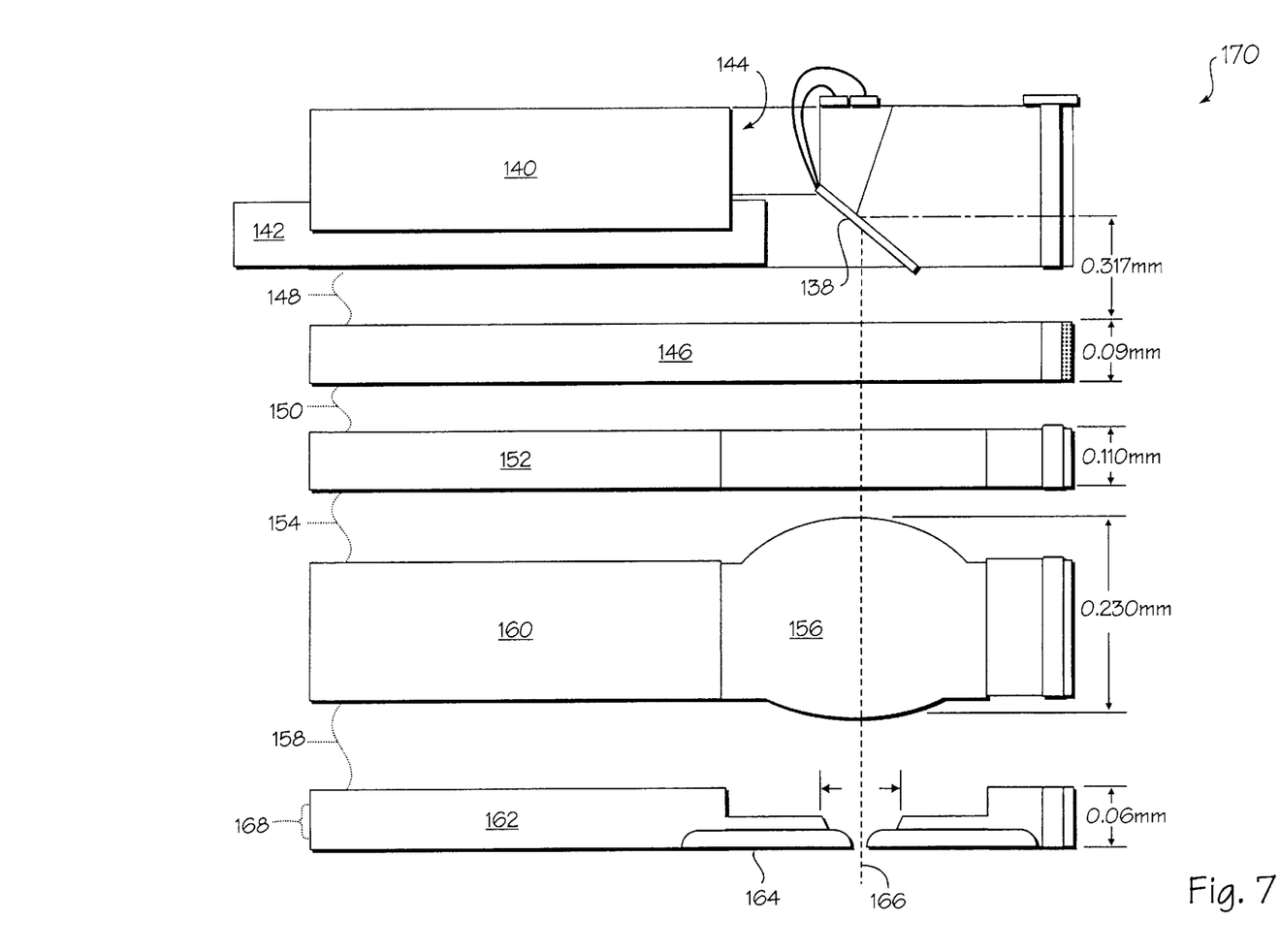
FIG. 7 is an expanded view of a 2D cross-section of a MO head, designed for wafer-level manufacture in an array.

Referring now to FIG. 7, there is seen another embodiment of a micro MO head, entailing a micro-composite lens 156 assembly 160 placed into a micro-head 170, which is producible in an array format using integrated wafer-level manufacturing techniques. This embodiment comprises a head body 140 with an aperture 144 etched to provide for placement of the optical fiber 142. Deposited on a surface of the body 140 is a micro-mirror 138. The ¼ wave plate 146 may be added if polarized light is used such as with a MO head, but may not be required for other designs such as optical drives or applications where non-polarized light is used. Between the wave plate 146 and the micro-lens 156 is placed a spacer 152, or the space may be maintained by an equivalent built-up feature on the micro-lens body 156, or a design may not require a spacer at all. In a magneto-optical embodiment, the design includes a wafer 162 in which is manufactured a coil 164. In addition, a SiN 'window' 166 may be placed on the opening of wafer assembly 162 to prevent debris from contacting the lens 156 surface. All of the aforementioned subcomponents are then bonded together (148, 150, 154, 158, & 168) into an array stack and diced to provide the completed individual heads. The heads may further be a flying head embodiment.

Along with providing a lens with a high NA that can be manufactured with existing micropart techniques, there are additional benefits obtained with the present invention. The ease of manufacture and assembly when using automated wafer-level manufacturing techniques provides lower production costs through; higher throughput rates, the reduction of human 'hands on the part' labor, and the compatibility with known manufacturing processes. This invention allows for a lens design that is tailorable through material selection, lens element design, and the 'stacking' feature, to a wide range of requirements. Another benefit is this design uses low cost materials that are readily available now and in the near future. Also, the wide range of material and construction options allow for a design adaptable to lens shapes not easily produced in other ways, to changing material costs, changing product needs, and to material availability.

Exemplary specification requirements and performance data are provided in a Table 1. For all designs, a total focused wavefront formed by a manufactured lens is compared to an ideal lens and the comparison is referred to as a RMS wavefront error. This difference is created by any improper surface contours as well as any radial misalignment of all lenses and any aspheric surface(s) to a common axis. A result is then calculated as a sum-tolerance value known as a 'root-mean-square'. An Image FOV is the image-space field-of-view, an area over which a focused spot in image space can be moved while still maintaining the acceptable RMS wavefront error. An Object Space NA and an Image Space NA are, respectively, a sine of an angle of an outermost ray on an object side of the lens and an image side of the lens. Finally, a 'Total Track' is a distance from an end of an optical fiber to a read or read/write disk surface (object-to-image distance for the lens).

TABLE 1

Requirements and Design Specifications

| Parameter | Requirement Value | Preferred Embodiment (Photoresist Lenses) As-Designed Value | Alternate Embodiment (Ball-Photoresist Lenses) As-Designed Value |
| --- | --- | --- | --- |
| Object Space NA | 0.12 | 0.12 | 0.12 |
| Image Space NA | 0.80 | 0.80 | 0.80 |
| Focused Spot Size | <0.48 $\mu$m | 0.48 $\mu$m | <0.41 $\mu$m |
| Object-to-lens distance | >0.5 mm | 0.953 mm | 0.878 mm |
| Working distance (lens-to-image) | >0.03 mm | 0.03 mm | 0.03 mm |
| Total track (object-to-image) | <1.3 mm | 1.284 mm | 1.194 mm |
| Lens diameter | <0.4 mm | 0.230 mm | 0.4 mm |
| Lens thickness | <0.4 mm | 0.301 mm | 0.286 mm |
| Wavelength | 660.0 ± 10.0 nm | 660 ± 10.0 mm | 660 ± 10.0 nm |
| Operating temperature | 10–60° C. | 10–60° C. | 10–60° C. |
| RMS wavefront error | <0.08 waves | <0.079 waves | <0.064 waves |
| Image FOV | ±3.0 $\mu$m | ±3.0 $\mu$m | ±3.0 $\mu$m |
| Transmission | >87% | >87% | >87% |

It should be noted that the present invention is applicable to an MO or optical disk drive used to record and reproduce information and in addition to an optical disk drive used explicitly for reproducing information. Further, the present invention is not limited to the embodiments described heretofore, but variations, alternate combinations, and modifications may be made for use in other optical applications without departing from the scope of the invention.

What is claimed:

1. A micro-lens assembly comprising:
   a wafer level processed substrate, wherein the wafer level processed substrate comprises an aperture; and
   a first lens, wherein the first lens comprises a round spherical surface portion and a non-spherical surface portion, wherein the first lens is disposed within the aperture.

2. The micro-lens assembly of claim 1, further comprising an aspheric lens coupled to the wafer level processed substrate, wherein an optical axis of the aspheric lens is in alignment with an optical axis of the first lens.

3. The micro-lens assembly of claim 1, further comprising a photo-resist lens coupled to the wafer level processed substrate, wherein an optical axis of the photo-resist lens is in alignment with an optical axis of the first lens.

4. The micro-lens assembly of claim 1, wherein the one non spherical surface portion comprises an aspheric surface portion.

5. The micro-lens assembly of claim 1, wherein the non spherical surface portion comprises a flat surface portion.

6. The micro-lens assembly of claim 1, wherein the non spherical surface portion comprises an aspheric surface portion and a flat surface portion.

7. The micro-lens assembly of claim 1, wherein the first lens comprises a glass.

8. The micro-lens assembly of claim 1, wherein the first lens comprises a crystal.

9. The micro-lens assembly of claim 8, wherein the crystal is a sapphire.

10. A micro-lens assembly comprising:
    a wafer level substrate, wherein the wafer level substrate comprises an aperture;
    a first lens, wherein the first lens comprises a round spherical surface and a non-spherical surface, and wherein the first lens is disposed within the aperture; and
    a second lens, wherein an optical axis of the second lens is in alignment with an optical axis of the first lens.

11. The micro-lens assembly of claim 10, wherein the non-spherical surface comprises a flat surface.

12. The micro-lens assembly of claim 11, wherein the non-spherical surface further comprises an aspheric surface.

13. The micro-lens assembly of claim 10, wherein the second lens comprises a photo-resist lens.

14. The micro-lens assembly of claim 10, wherein the second lens comprises an aspheric lens.

15. The micro-lens assembly of claim 10, wherein the second lens comprises a photo-resist lens and an aspheric lens.

* * * * *